(12) United States Patent
Park et al.

(10) Patent No.: US 8,903,190 B2
(45) Date of Patent: Dec. 2, 2014

(54) MEDIAN FILTERING METHOD AND APPARATUS

(75) Inventors: Sung Bae Park, Seongnam-si (KR); Hyun Sang Park, Cheonan-si (KR); Young Su Moon, Seoul (KR); Shi Hwa Lee, Seoul (KR); Soo Jung Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 678 days.

(21) Appl. No.: 13/067,949

(22) Filed: Jul. 8, 2011

(65) Prior Publication Data
US 2012/0076432 A1 Mar. 29, 2012

(30) Foreign Application Priority Data
Sep. 28, 2010 (KR) .................. 10-2010-0093586

(51) Int. Cl.
- *G06K 9/00* (2006.01)
- *G06T 5/20* (2006.01)
- *G06T 5/00* (2006.01)
- *G06K 9/40* (2006.01)

(52) U.S. Cl.
CPC ... *G06K 9/00973* (2013.01); *G06T 2207/20032* (2013.01); *G06T 5/20* (2013.01); *G06T 5/002* (2013.01); *G06T 2200/28* (2013.01); *G06K 9/40* (2013.01)

USPC .......................................................... 382/262

(58) Field of Classification Search
USPC .......................................................... 382/262
See application file for complete search history.

(56) References Cited

U.S. PATENT DOCUMENTS

| | | | |
|---|---|---|---|
| 5,708,595 A | 1/1998 | Connell | |
| 6,078,213 A | 6/2000 | Huang | |
| 7,498,961 B2 * | 3/2009 | Weissman et al. | 341/107 |
| 8,098,952 B2 * | 1/2012 | Zhang et al. | 382/262 |
| 8,452,117 B2 * | 5/2013 | Adams et al. | 382/262 |
| 2001/0034749 A1 * | 10/2001 | Jiang | 708/202 |
| 2002/0063208 A1 * | 5/2002 | Hastings | 250/281 |
| 2003/0095718 A1 * | 5/2003 | Yamazaki | 382/262 |

FOREIGN PATENT DOCUMENTS

| | | |
|---|---|---|
| JP | 05-233804 | 9/1993 |
| JP | 4143288 | 6/2008 |

* cited by examiner

*Primary Examiner* — Wesley Tucker
(74) *Attorney, Agent, or Firm* — Staas & Halsey LLP (57) ABSTRACT

A median filtering apparatus and method for removing noise and improving an image quality with respect to all types of input images are provided. The median filtering apparatus may receive an input of N pieces of data, may form a data set including the N pieces of data, may calculate a difference array having an N×N size based on the N pieces of data in the data set, may sum component values for each column of the difference array, and may calculate an index of a column having a smallest value among sum values that are obtained by the summing operation and that are greater than or equal to a preset value.

18 Claims, 9 Drawing Sheets

MEDIAN FILTERING METHOD AND APPARATUS

CROSS-REFERENCE TO RELATED APPLICATIONS

This application claims the benefit of Korean Patent Application No. 10-2010-0093586, filed on Sep. 28, 2010, in the Korean Intellectual Property Office, the disclosure of which is incorporated herein by reference.

BACKGROUND

1. Field

Example embodiments of the following description relate to a median filtering method and apparatus required to remove noise and improve an image quality with respect to all types of input images.

2. Description of the Related Art

An image signal processor requires a higher-level noise removal technology, as a resolution of an image sensor increases and a pixel size decreases. To stably supply improved image processing technologies such as an anti-shake technology, a noise removal technology with an excellent performance and low cost needs to be performed in advance.

A median filter is used to remove noise, together with a mean filter. The median filter provides an excellent subjective image quality, but an operation amount of the median filter is relatively high, compared with the mean filter. When N pieces of data are provided, the mean filter may compute a mean value of the N pieces of data, and accordingly addition may be performed N−1 times and division may be performed once. Assuming that an operation amount required for the division is equal to an operation amount required for the addition, an operation needs to be performed N times. A conventional median filter searches for a minimum value or a maximum value from all of N pieces of data, searches for a minimum value or a maximum value from remaining data again, and searches for a median value by excluding the N pieces of data one by one. When N is an odd number, the mean filter may require an operation in proportion to N, and the median filter may require an operation in proportion to $N^2$. When the median filter is applied to a two-dimensional (2D) space having an N×N block size, the operation amount may be proportional to $N^4$. Additionally, when the median filter is applied to a three-dimensional (3D) space, the operation amount may be proportional to $N^6$. Accordingly, in a multi-dimensional space, the operation amount may be exponentially increased.

SUMMARY

A median filtering apparatus includes a difference array calculating unit to form a data set including N pieces of data, and to calculate a difference array having an N×N size based on the N pieces of data in the data set, where N is an integer greater than one, a summing unit to sum component values for each column of the difference array to obtain sum values, and an index calculating unit to calculate an index of a column having a smallest value among the sum values. The sum values are greater than or equal to a preset value. The preset value may correspond to "(N−1)/2".

The median filtering apparatus may further include an input unit to receive an output of the N pieces of data a memory unit to store the N pieces of data and N indexes corresponding to the N pieces of data, and a median value determination unit to determine a median value from the stored N pieces of data, based on the calculated index.

The difference array calculating unit may include a comparing unit to select first data and second data from among the N pieces of data, and to determine whether the first data has a value greater than or equal to a value of the second data.

The summing unit may include a counter to count non-zero values for each column of the difference array, a comparing unit to determine whether a counted value is greater than or equal to the preset value, and a multiplexer (MUX) to receive an input of the counted value and a predetermined value greater than N, to output the counted value when the counted value is greater than or equal to the preset value, and to output the predetermined value when the counted value is less than the preset value.

The counter may include an adder to perform bitwise counting using N−1 comparison data values as an input, when N pieces of data are contained in the data set.

The index calculating unit may include a minimum value determination unit to determine a predetermined value greater than N as a first input value and a second input value when the sum values are less than the preset value, or to otherwise determine the sum values as the first input value and the second input value, and to output a minimum value and a portion of bits of the index based on the first input value and the second input value, and a multiplexer (MUX) to receive an input of the portion of the bits of the index, and to output a portion of a final bit of the index.

The minimum value determination unit may include a comparing unit to determine whether the first input value is greater than the second input value, to output a signal '1' when the first input value is greater than the second input value, and to output a signal '0' when the first input value is equal to or less than the second input value, and another multiplexer (MUX) to output a smaller input value between the first input value and the second input value, using, as a selection signal, a signal output from the another multiplexer (MUX).

The index calculating unit may include a pipeline register to store values of indexes calculated during comparing of the sum values.

The foregoing and/or other aspects are achieved by providing a median filtering method including forming a data set including N pieces of data, and calculating a difference array having an N×N size based on the N pieces of data in the data set, where N is an integer greater than one, summing component values for each column of the difference array to obtain sum values, and calculating an index of a column having a smallest value among the sum values, the sum values being greater than or equal to a preset value.

The median filtering method may further include storing the N pieces of data and N indexes corresponding to the N pieces of data, and determining a median value from the stored N pieces of data, based on the calculated index.

The forming may include selecting first data and second data from among the N pieces of data, and determining whether the first data has a value greater than or equal to a value of the second data.

The summing may include counting non-zero values for each column of the difference array, determining whether a counted value is greater than or equal to the preset value, and receiving an input of the counted value and a predetermined value greater than N, outputting the counted value when the counted value is greater than or equal to the preset value, and outputting the predetermined value when the counted value is less than the preset value.

The calculating of the index may include determining a predetermined value greater than N as a first input value and a second input value when the sum values are less than the preset value, or otherwise determining the sum values as the first input value and the second input value, and outputting a minimum value and a portion of bits of the index based on the first input value and the second input value, and receiving an input of the portion of the bits of the index, and outputting a portion of a final bit of the index.

The determining may include determining whether the first input value is greater than the second input value, outputting a signal '1' when the first input value is greater than the second input value, and outputting a signal '0' when the first input value is equal to or less than the second input value, and outputting a smaller input value between the first input value and the second input value, using, as a selection signal, a result obtained by determining whether the first input value is greater than the second input value.

The calculating of the index may include storing values of indexes calculated during comparing of the sum values.

Additional aspects, features, and/or advantages of example embodiments will be set forth in part in the description which follows and, in part, will be apparent from the description, or may be learned by practice of the disclosure.

The example embodiments may include a median filtering apparatus and method that may determine a minimum index using a difference array, thereby reducing an operation amount required to calculate a median value.

The example embodiments may also include a median filtering apparatus and method that may reduce a number of stages of a pipeline required for median filtering by half compared with a conventional technology, so that a hardware implementation cost may be reduced.

The example embodiments may also include a median filtering apparatus and method that may reduce an operation amount and a number of stages of a pipeline, thereby enlarging a kernel with the same cost, so that a performance of a median filter may be improved.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
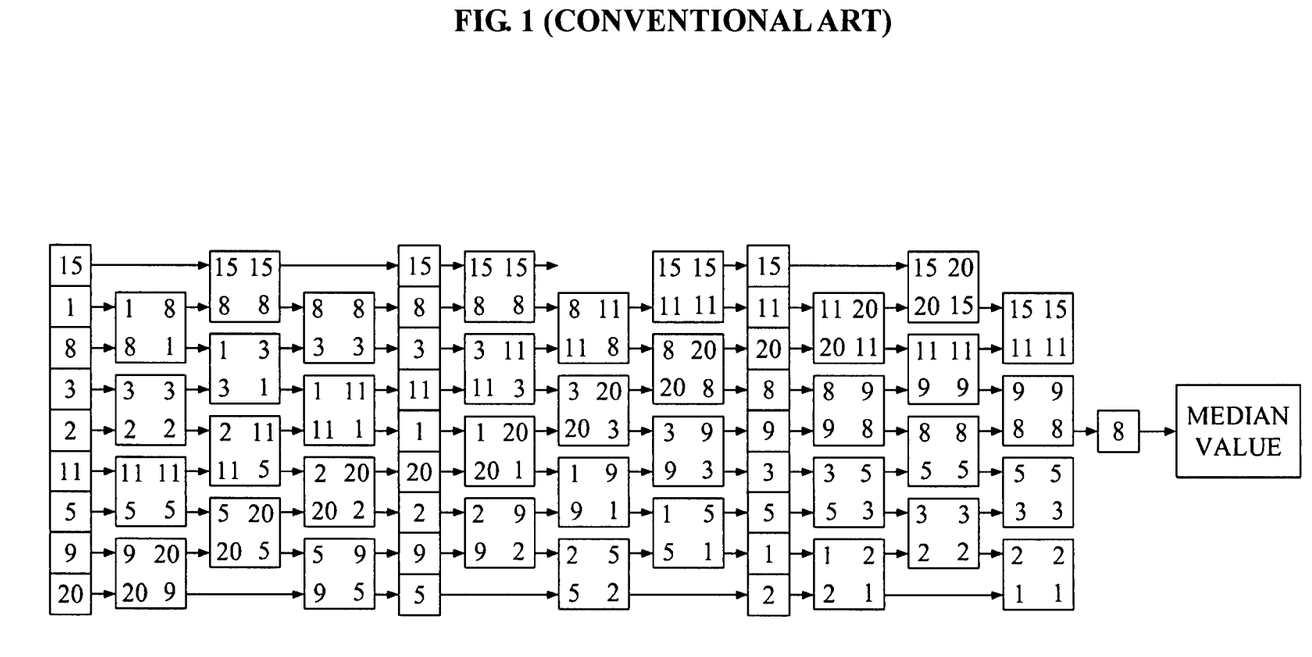
FIG. 1 is a diagram of a hardware structure of a general median filter.

Reference will now be made in detail to example embodiments, examples of which are illustrated in the accompanying drawings, wherein like reference numerals refer to the like elements throughout. Example embodiments are described below to explain the present disclosure by referring to the figures. FIG. 1 illustrates a hardware structure of a general median filter. Referring to FIG. 1, when nine pieces of data with different values are received, a median filter may calculate a median value. Specifically, the nine pieces of data may be input to square modules that each have two inputs and two outputs. Each of the square modules may compare two pieces of input data, may output data having a higher value to an upper square module, and may output data having a lower value to a lower square module. In other words, the square modules may function as comparators.

A value of "8" may be calculated as a median value, by performing nine times a comparison operation of the nine pieces of data. Here, the median value may refer to a value of fifth data when the nine pieces of data are arranged based on a size. When nine comparators are sequentially operated with respect to the nine pieces of data, hardware operation time may be considerably longer. To reduce the operation time, a pipeline register may be inserted whenever the nine pieces of data pass through three comparators. The pipeline register may be used to store values obtained by comparators. When an amount of data to be filtered is increased, a number of pipeline registers to be inserted may also be increased. Since a pipeline register is higher in cost than a comparator, hardware implementation costs may be increased as a number of pipeline registers increases.

Figure 2:
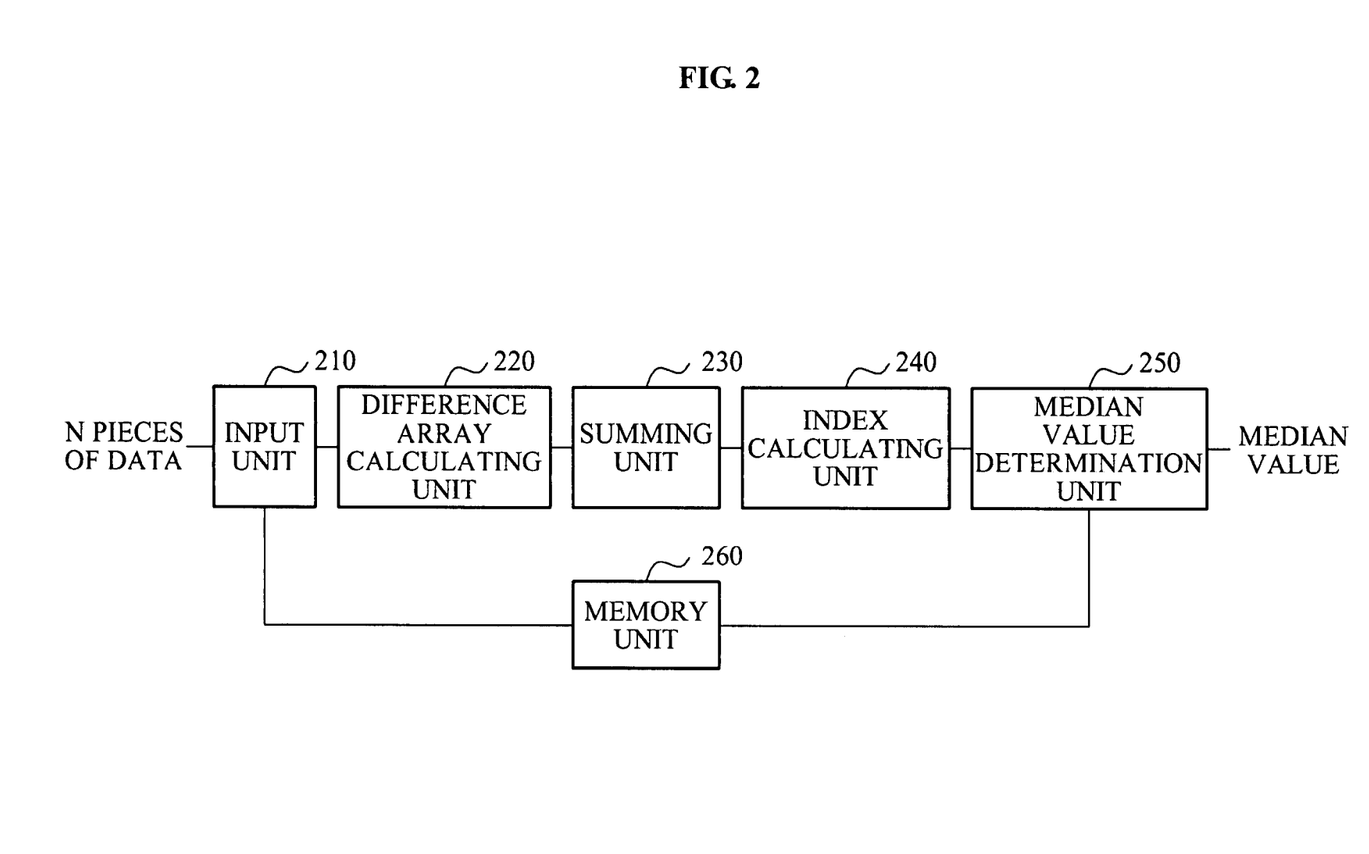
FIG. 2 is a block diagram of a median filtering apparatus according to example embodiments.

FIG. 2 illustrates a block diagram of a median filtering apparatus according to example embodiments. The median filtering apparatus of FIG. 2 may include an input unit 210, a difference array calculating unit 220, a summing unit 230, an index calculating unit 240, a median value determination unit 250, and a memory unit 260.

The input unit 210 may receive an input of N pieces of data. The N pieces of data may include brightness values, saturation values, illuminance values, color values, and the like that are used to form an input image. When a plurality of pieces of data are received, the input unit 210 may start calculation of a median value.

The difference array calculating unit 220 may form a data set including the N pieces of received data, and may calculate a difference array having an N×N size based on the N pieces of data in the data set.

Specifically, the difference array calculating unit 220 may form a data set with indexes corresponding to the N pieces of data. For example, when nine pieces of data are received, the difference array calculating unit 220 may form a data set X including the nine pieces of data, as given in "X={15,1,8,3, 2,11,5,9,20}" where data 15 may have a first index in the data set X, and data 20 may have a ninth index in the data set X.

Additionally, the difference array calculating unit 220 may calculate a difference array based on the data set. The difference array may be an N×N matrix that may have "1" when one of data in the data set has a value greater than another data, and that may have "0" when one of the data in the data set has a value less than another data. The data set X may be shown, for example, as in Table 1 below. In a first row of Table 1, data 15 has a value greater than values of pieces of data other than data 20 and accordingly, cells other than a cell of data 20 may have "1". In the second row, data 1 has a smallest value among pieces of other data and accordingly, all cells in the second row may have "0". Similarly, a difference array having a 9×9 size for the nine pieces of data may be calculated. A further generalized function of the difference array calculating unit 220 may be expressed using a pseudo-code, as given in "diff [i][j]=x[i]−x[j]>0 (0≤i, j≤N−1)" where N is an odd number, "diff[i][j]" denotes a difference array of an i-th row and a j-th column, "x[i]" denotes a data set x located in a row, "x[j]" denotes a data set x located in a column, and "x[i]−x[j]>0" denotes that "diff[i][j]" corresponds to "1" when "x[i]" is greater than "x[j]", and corresponds to "0" when "x[i]" is less than "x[j]". Here, when "x[i]" is equal to "x[j]", "diff[i][j]" may not be defined.

TABLE 1

|    | 15 | 1 | 8 | 3 | 2 | 11 | 5 | 9 | 20 |
|----|----|----|----|----|----|----|----|----|----|
| 15 |    | 1 | 1 | 1 | 1 | 1  | 1 | 1 | 0  |
| 1  | 0  |   | 0 | 0 | 0 | 0  | 0 | 0 | 0  |
| 8  | 0  | 1 |   | 1 | 1 | 0  | 1 | 0 | 0  |
| 3  | 0  | 1 | 0 |   | 1 | 0  | 0 | 0 | 0  |
| 2  | 0  | 1 | 0 | 0 |   | 0  | 0 | 0 | 0  |
| 11 | 0  | 1 | 1 | 1 | 1 |    | 1 | 1 | 0  |
| 5  | 0  | 1 | 0 | 1 | 1 | 0  |   | 0 | 0  |
| 9  | 0  | 1 | 1 | 1 | 1 | 0  | 1 |   | 0  |
| 20 | 1  | 1 | 1 | 1 | 1 | 1  | 1 | 1 |    |

The summing unit 230 may sum component values for each column of a difference array. Specifically, the summing unit 230 may add up component values for each column of a difference array having an N×N size. Referring to Table 1, nine columns are provided. The summing unit 230 may add up component values for each of the nine columns, and as a result, "{1,8,4,6,7,2,5,3,0}" may be obtained. A function of the summing unit 230 may be expressed using a pseudo-code, as given in "gte[j]=Σidiff[i][j] (0≤j≤N−1)" where "gte[j]" denotes a value obtained by summing components of a j-th column, that is, a value obtained by adding values of all rows in the j-th column.

The index calculating unit 240 may calculate an index of a column having a smallest value among sum values obtained by the summing unit 230. Here, the sum values may be greater than or equal to a preset value. The index calculating unit 240 may calculate an index of data having a closest value to the preset value. Here, the preset value may correspond to "(N−1)/2". When N pieces of data are input and are arranged in a data set based on the size, a median value may be located in "(N−1)/2".

Specifically, the index calculating unit 240 may calculate an index having a value greater than or equal to "(N−1)/2" among the sum values obtained by the summing unit 230. Additionally, the index calculating unit 240 may calculate an index having a closest value to "(N−1)/2" among indexes having values greater than or equal to "(N−1)/2", that is, may calculate a minimum index. A function of the index calculating unit 240 may be expressed using a pseudo-code, as given in "$i_M$=argmin{gte(j)|gte(j)≥(N−1)/2}" where $i_M$ denotes an index having the closest value to "(N−1)/2" among values obtained by summing component values of each column.

Additionally, the index calculating unit 240 may include a pipeline register. The pipeline register may be inserted to store values of indexes calculated during comparing of the sum values. The index calculating unit 240 may use the pipeline register together with comparators, to reduce a hardware operation time.

The median value determination unit 250 may determine a median value from the stored N pieces of data, based on the calculated index. Specifically, the median value determination unit 250 may determine data matched to the index in the data set including the N pieces of data. Here, the data matched to the index may be a median value. Additionally, the index may be matched to an address for a memory. The data corresponding to the index may be stored in the memory.

The memory unit 260 may store the N pieces of data, and N indexes corresponding to the N pieces of data. The memory unit 260 may store the N pieces of received data, and may store the N indexes corresponding to the N pieces of data of the data set.

Figure 3:
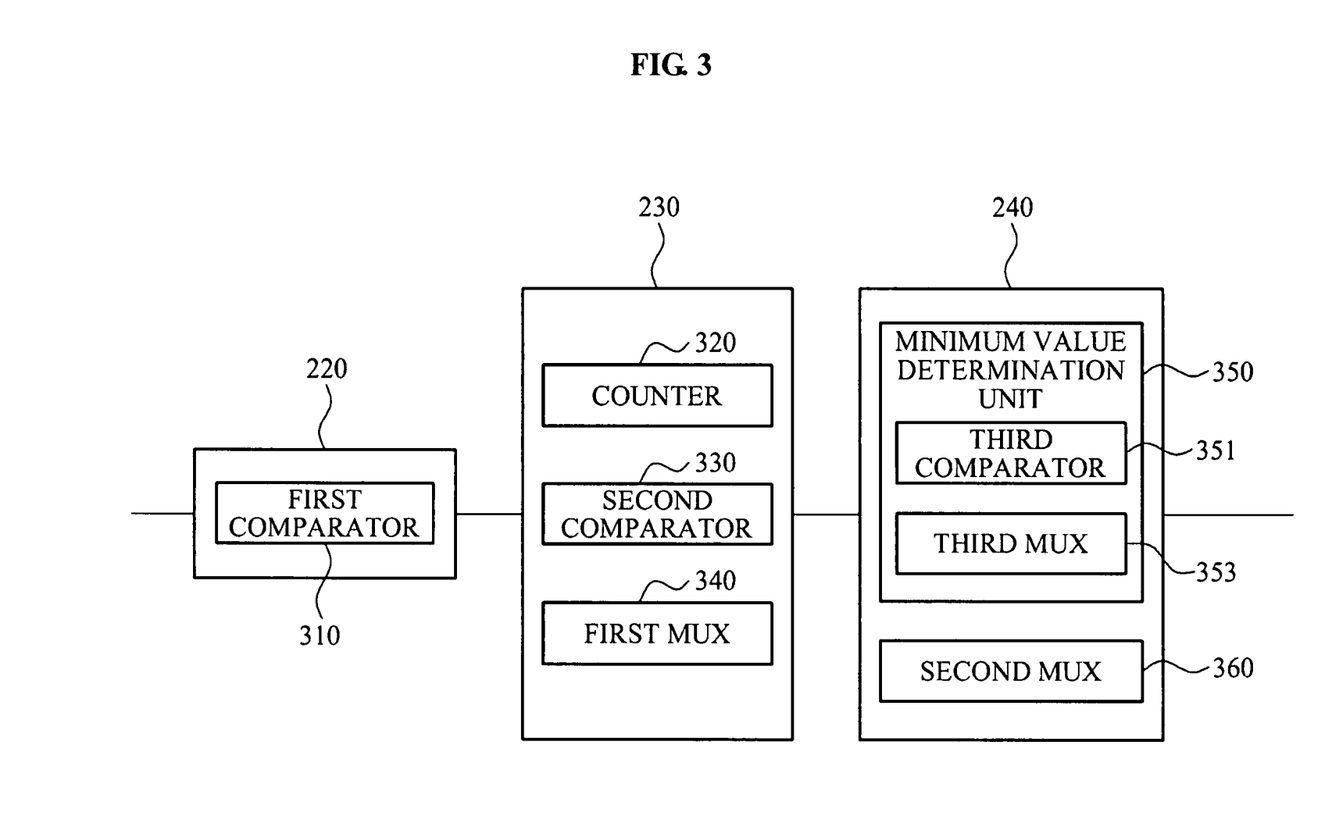
FIG. 3 is a detailed block diagram of the median filtering apparatus of FIG. 2.

FIG. 3 illustrates, in detail, a block diagram of the median filtering apparatus of FIG. 2. In FIG. 3, the difference array calculating unit 220 may include a first comparator 310.

The first comparator 310 may select first data and second data from among the N pieces of data, and may determine whether the first data has a value greater than or equal to a value of the second data. Specifically, the first comparator 310 may compare a reference input value with a comparison input value. When the reference input value is greater than or equal to the comparison input value, the first comparator 310 may output "1". Conversely, when the reference input value is less than the comparison input value, the first comparator 310 may output "0". The first data and the second data may be respectively used as the reference input value and the comparison input value. The reference input value may be a value corresponding to a row in the difference array, and the comparison input value may be a value corresponding to a column in the difference array.

In an example, the difference array calculating unit 220 may include a plurality of first comparators 310. The difference array calculating unit 220 may use the plurality of first comparators 310, to calculate a difference array with respect to N pieces of data.

The summing unit 230 may include a counter 320, a second comparator 330, and a first multiplexer (MUX) 340, as illustrated in FIG. 3.

The counter 320 may count non-zero values for each column of the difference array. The counter 320 may be disposed in each column of the difference array, and may count non-zero values. When the input unit 210 receives N pieces of data, the counter 320 may use, as input values, values output from N−1 first comparators 310. The second comparator 330 may determine whether a counted value output from the counter 320 is greater than or equal to a preset value. Here, the counted value and the preset value may be used as input values. When the counted value is greater than or equal to the preset value, the second comparator 330 may output "1". When the counted value is less than the preset value, the second comparator 330 may output "0". The preset value may correspond to "(N−1)/2". The first MUX 340 may receive an input of the counted value and a predetermined value. Here, the predetermined value may be greater than N indicating a number of pieces of data. When the counted value is greater than or equal to the preset value, the first MUX 340 may output the counted value. When the counted value is less than the preset value, the first MUX 340 may output the predetermined value.

Specifically, the first MUX 340 may use an output value of the second comparator 330 as a selection signal. When the output value is "1", the first MUX 340 may output the counted value, and when the output value is "0", the first MUX 340 may output the predetermined value. Here, since the predetermined value greater than N may be input, a value output from the first MUX 340 may become greater than the preset value.

The index calculating unit 240 may include a minimum value determination unit 350 and a second MUX 360. When the sum values obtained by the summing unit 230 are less than the preset value, the minimum value determination unit 350 may determine the predetermined value greater than N as an input value. Otherwise, the minimum value determination unit 350 may determine the sum values obtained by the summing unit 230 as input values. Here, the minimum value determination unit 350 may have two input values, namely, a first input value and a second input value.

Additionally, the minimum value determination unit 350 may output a minimum value, and a portion of bits of an index having a closest value to the preset value, based on the first input value and the second input value. Here, the minimum value may refer to a smallest value among input values. The minimum value determination unit 350 may output a smaller value between the first input value and the second input value, and may output "1" or "0" based on a relationship between the first input value and the second input value to form a portion of bits of a minimum index, namely, an index having the closest value to the preset value. The minimum value determination unit 350 may include a third comparator 351 and a third MUX 353. The third comparator 351 may determine whether the first input value is greater than the second input value. When the first input value is greater than the second input value, the third comparator 351 may output a signal "1". When the first input value is less than or equal to the second input value, the third comparator 351 may output a signal "0". The third MUX 353 may output a smaller input value between the first input value and the second input value, using a signal output from the third MUX 351 as a selection signal. Further descriptions thereof will be given with reference to FIGS. 6A and 6B.

The second MUX 360 may receive the portion of the bits of the minimum index from the minimum value determination unit 350, and may output a portion of a final bit of the minimum index.

In an example, the index calculating unit 240 may include a plurality of minimum value determination units 350. Here, output signals of the minimum value determination units 350 are input to the second MUX 360, and a portion of a final bit of the minimum index may be output. Further descriptions thereof will be given with reference to FIG. 6B.

In the index calculating unit 240 of the median filtering apparatus of FIG. 2, a data operation amount may be reduced by half every time the data passes through the minimum value determination unit 350 and accordingly, a total operation amount may be reduced, compared with a general median filtering apparatus. Additionally, a number of pipeline registers required to reduce a hardware operation time may also be reduced to less than half.

Figure 4:
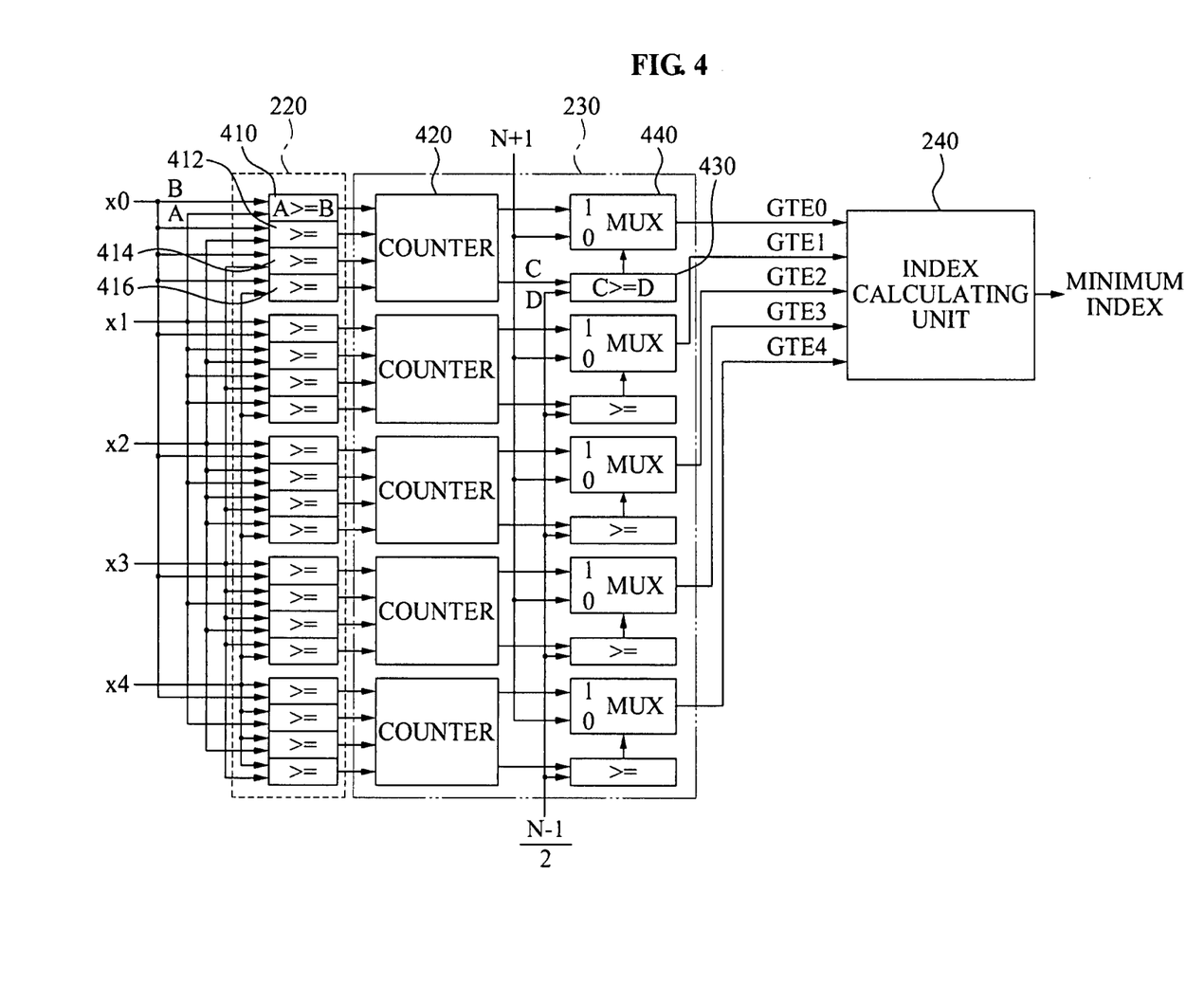
FIG. 4 is a diagram of a hardware structure of the median filtering apparatus of FIG. 2.

FIG. 4 illustrates a diagram of a hardware structure of the median filtering apparatus of FIG. 2. In FIG. 4, the median filtering apparatus may be implemented through a logic circuit. As described above, the median filtering apparatus may include the difference array calculating unit 220, the summing unit 230, and the index calculating unit 240. First, five pieces of data x0, x1, x2, x3, and x4 may be input to the difference array calculating unit 220. The difference array calculating unit 220 may include first comparators 410, 412, 414, and 416. When an input signal A has a value greater than or equal to a value of an input signal B, the first comparator 410 may output "1". When the input signal A has a value less than the value of the input signal B, the first comparator 410 may output "0". In the first comparator 410, the input signals A and B may indicate data x1 and x0, respectively. Since five pieces of data are input, four comparators may be provided for each of the five pieces of data. In other words, data x0 needs to be compared with data x1, x2, x3, and x4, and accordingly the four first comparators 410, 412, 414, and 416 may be required. Additionally, since four comparators are required for each input data, 20 first comparators may be required for all of the five pieces of data x0, x1, x2, x3, and x4.

The summing unit 230 may include a counter 420, a second comparator 430, and a first MUX 440. Values output from the first comparators 410, 412, 414, and 416 may be input to the counter 420. The counter 420 may sum non-zero values among the input values. A value C output from the counter 420 may be input to the second comparator 430 and the first MUX 440. The second comparator 430 may compare the value C with a value D of "(N−1)/2". When the value C is greater than or equal to the value D, the second comparator 430 may output "1". When the value C is less than the value D, the second comparator 430 may output "0". The first MUX 440 may include a multiplexing unit, and may determine an output value, by using a value output from the second comparator 430 as a selection signal. Specifically, when a value of "1" is output from the second comparator 430, the first MUX 440 may output a value output from the counter 420 as GTE0. When a value of "0" is output from the second comparator 430, the first MUX 440 may output a large value "N+1" as GTE0. Here, GTE0 may indicate a sum value obtained by summing component values of a first column in a difference array. Similarly, with respect to the data x1, x2, x3, and x4, sum values GTE1, GTE2, GTE3, and GTE4 may be obtained by summing component values of each column. Since the five pieces of data are input, five sum values may be obtained in a difference array having a 5×5 size.

The index calculating unit 240 may calculate a minimum index having a smallest value among the sum values GTE0, GTE1, GTE2, GTE3, and GTE4. An operation of the index calculating unit 240 will be further described with reference to FIGS. 6A and 6B. Specifically, when values of 0, 4, 3, 2, and 1 are substituted into the data x0, x1, x2, x3, and x4, a data set "{0,4,3,2,1}" may be formed. Here, indexes 0, 1, 2, 3, and 4 may have values of 0, 4, 3, 2, and 1, respectively. Due to a small number of pieces of data, a value of "2" may be calculated as a median value. A generation of a set of GTE0, GTE1, GTE2, GTE3, and GTE4 has been described, and a calculation of a minimum index will be described with reference to FIG. 6B. A set "{4,0,1,2,3}" of values may be obtained by first comparators and counters. In other words, four values are greater than "0", no values are greater than "4", a value greater than "3", two values greater than "2", and three values greater than "1". Here, since N has a value of "5", "(N−1)/2" may have a value of "2", and "N+1" may have a value of "6". Additionally, a set of GTE0, GTE1, GTE2, GTE3, and GTE4 passing through a second comparator and a first MUX may correspond to "{4,6,6,2,3}". In other words, a sum value greater than or equal to a value of "(N−1)/2" may be output without a change, and a sum value less than the value of "(N−1)/2" may be output as "N+1=6". "N+1" and "N−1" in FIG. 4 may be provided from a controller (not illustrated).

Figure 5:
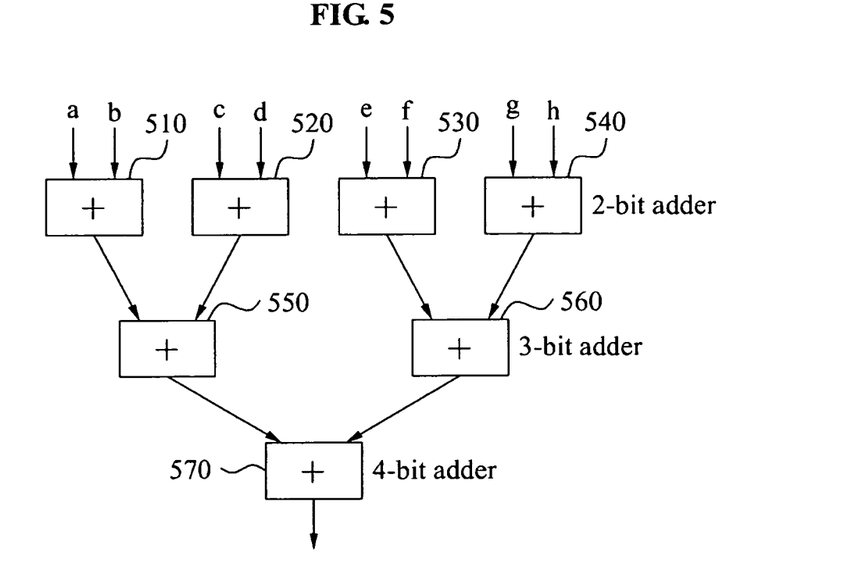
FIG. 5 is a diagram of a hardware structure of a counter according to example embodiments.

FIG. 5 illustrates a diagram of a hardware structure of a counter according to example embodiments. Referring to FIG. 5, the counter may be implemented by an adder. The counter may include an adder to perform bitwise counting using N−1 comparison data values as input, when N pieces of data are input. As described in FIG. 4, when N pieces of data are input, N−1 signals may pass through a first comparator, and accordingly N−1 input signals may be provided to the counter.

In FIG. 5, eight signals passing through the first comparator with respect to nine pieces of data may be input to the adder in the counter. Here, since bit calculation may be performed, a 4-bit adder may be implemented to represent nine values. Specifically, eight bits input to the adder may be indicated by a, b, c, d, e, f, g, and h. When a data set corresponds to "{0,1,2,3,4,5,6,7,8}", a signal passing through a first comparator with respect to input data "0" may be "1,1, "1,1,1,1,1,1". Since eight values are greater than "0" in the data set, 4 bits may be required to represent "8" using 2 bits. When "1,1,1,1,1,1,1,1" is input to "a,b,c,d,e,f,g,h", 2-bit adders 510, 520, 530, and 540 may have an output value of "10". When a value of "10" is given as an input value, 3-bit adders 550, and 560 may have an output value of "100". When a value of "100" is given as an input value, a 4-bit adder 570 may have an output value of "1000". Accordingly, an output value representing "8" by bits may be obtained. A delay time of an adder may be equal to a delay time of a 2(M−1) bit adder, and as a result, an influence of the delay time may not be significant. Here, M may have a value of "$\log_2(N-1)$."

Figure 6A:
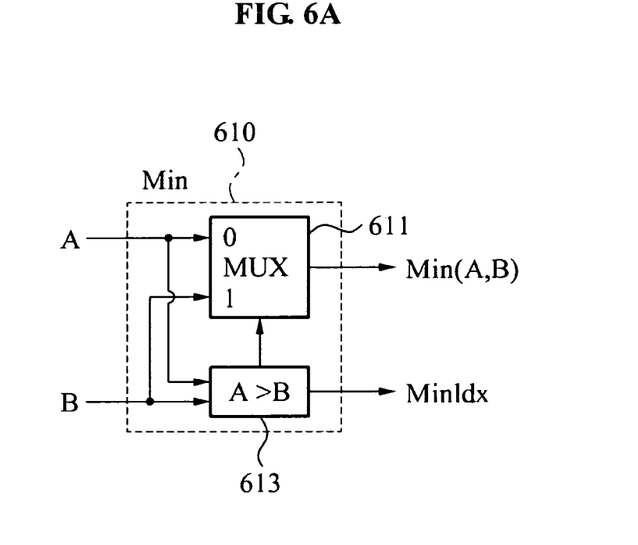
FIG. 6A is a diagram of a hardware structure of a minimum value determination unit according to example embodiments.

FIG. 6A illustrates a diagram of a hardware structure of a minimum value determination unit 610 according to example embodiments.

Referring to FIG. 6A, the minimum value determination unit 610 may include a MUX 611, and a comparator 613.

The MUX 611 may output a smaller value "Min(A,B)" between input signals A and B, by using an output value of the comparator 613 as a selection signal. The comparator 613 may compare the input signals A and B. When the input signal A is greater than the input signal B, the comparator 613 may output "1". When the input signal A is less than or equal to the input signal B, the comparator 613 may output "0". Additionally, the minimum value determination unit 610 may use the output value of the comparator 613 as a portion of bits of an index that is required to calculate a minimum index.

Figure 6B:
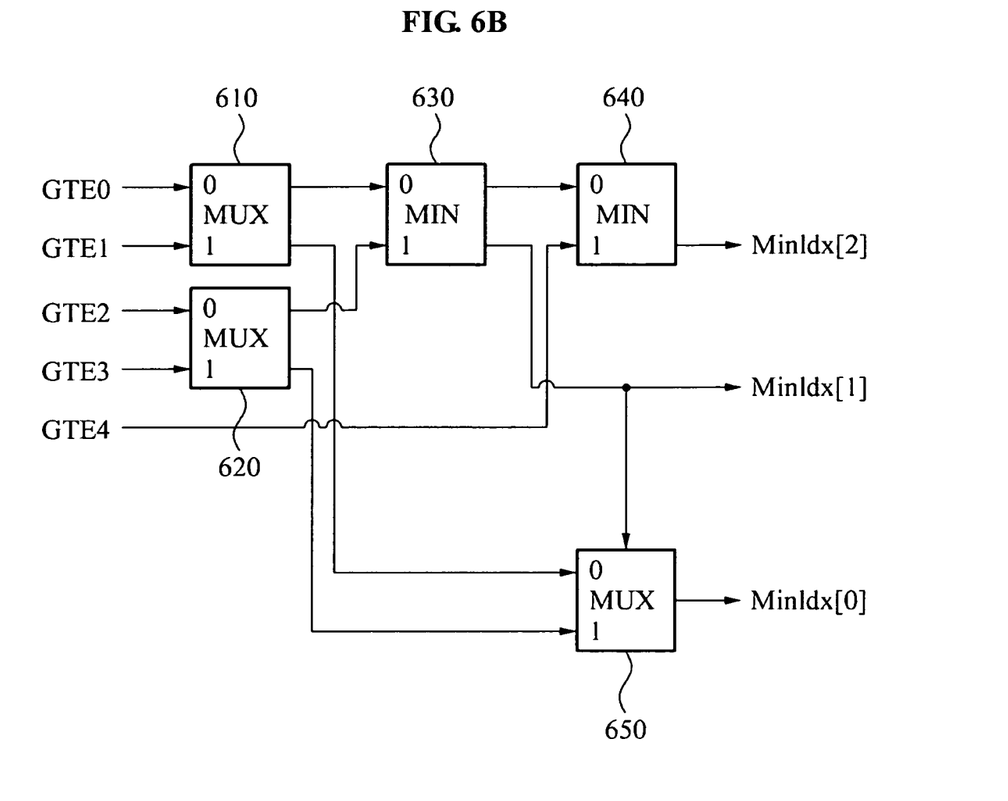
FIG. 6B is a diagram of a hardware structure of an index calculating unit according to example embodiments.

FIG. 6B illustrates a diagram of a hardware structure of an index calculating unit according to example embodiments. Referring to FIG. 6B, the index calculating unit may include a plurality of minimum value determination units 610, 620, 630, and 640, and a MUX 650. The index calculating unit may use, as input values, sum values obtained for each column in a difference array. The sum values GTE0, GTE1, GTE2, GTE3, and GTE4 of FIG. 4 may be input to the minimum value determination units 610, 620, 630, and 640.

Each of the minimum value determination unit 610, 620, 630, and 640 has two input values. Accordingly, GTE0 and GTE1 may be input to the minimum value determination unit 610, and GTE2 and GTE3 may be input to the minimum value determination unit 620. Additionally, GTE4 may be input to the minimum value determination unit 640.

The minimum value determination unit 610 may output, as "Min(A1,B1)", a smaller value between GTE0 and GTE1. When GTE0 is greater than GTE1, the minimum value determination unit 610 may output "1" as "Min(1)Idx", and when GTE0 is less than GTE1, the minimum value determination unit 610 may output "0" as "Min(1)Idx". Additionally, the minimum value determination unit 620 may output, as "Min(A2,B2)", a smaller value between GTE2 and GTE3. When GTE2 is greater than GTE3, the minimum value determination unit 620 may output "1" as "Min(2)Idx", and when GTE2 is less than GTE3, the minimum value determination unit 620 may output "0" as "Min(2)Idx".

Furthermore, the minimum value determination unit 630 may output, as "Min(A3,B3)", a smaller value between "Min(A1,B1)" and "Min(A2,B2)". When "Min(A1,B1)" is greater than "Min(A2,B2)", the minimum value determination unit 630 may output "1" as "Min(3)Idx", and when "Min(A1,B1)" is less than "Min(A2,B2)", the minimum value determination unit 630 may output "0" as "Min(3)Idx".

Moreover, the minimum value determination unit 640 may compare "Min(A3,B3)" with GTE4. When "Min(A3,B3)" is greater than GTE4, the minimum value determination unit 640 may output "1" as "MinIdx[2]", and when "Min(A3,B3)" is less than GTE4, the minimum value determination unit 640 may output "0" as "MinIdx[2]". Here, "MinIdx[2]" may indicate a Most Significant Bit (MSB) among three bits. Additionally, "Min(3)Idx" may become "MinIdx[1]" indicating a second bit among the three bits.

The MUX 650 may use "Min(1)Idx" and "Min(2)Idx" as input values. When "MinIdx[1]" has a value of "0", the MUX 650 may output "Min(1)Idx" as "MinIdx[0]. When "MinIdx[1]" has a value of "1", the MUX 650 may output "Min(2)Idx" as "MinIdx[0]. Here, "MinIdx[0]" may indicate a Least Significant Bit (LSB) among the three bits.

When a set of GTE0, GTE1, GTE2, GTE3, and GTE4 corresponds to "{4,6,6,2,3}", "Min(A1,B1)" may have a value of "4", and "Min(1)Idx" may have a value of "0". Additionally, "Min(A2,B2)" may have a value of "2", and "Min(2)Idx" may have a value of "1". "Min(A3,B3)" may have a value of "2", "Min(3)Idx" may have a value of "1", and "MinIdx[2]" may have a value of "0". Since "MinIdx[1]" is equal to "Min(3)Idx", "MinIdx[1]" may have a value of "1". Additionally, since "MinIdx[1]" has a value of "1", "MinIdx[0]" may have the same value as "Min(2)Idx", that is, a value of "1". A minimum index may be "011". Accordingly, the minimum index may refer to GTE3. In other words, a value of data corresponding to a fourth index may be a median value. In the data set "{0,4,3,2,1}", data corresponding to the fourth index may have a value of "2" that is equal to a median value calculated directly in the data set.

Figure 7:
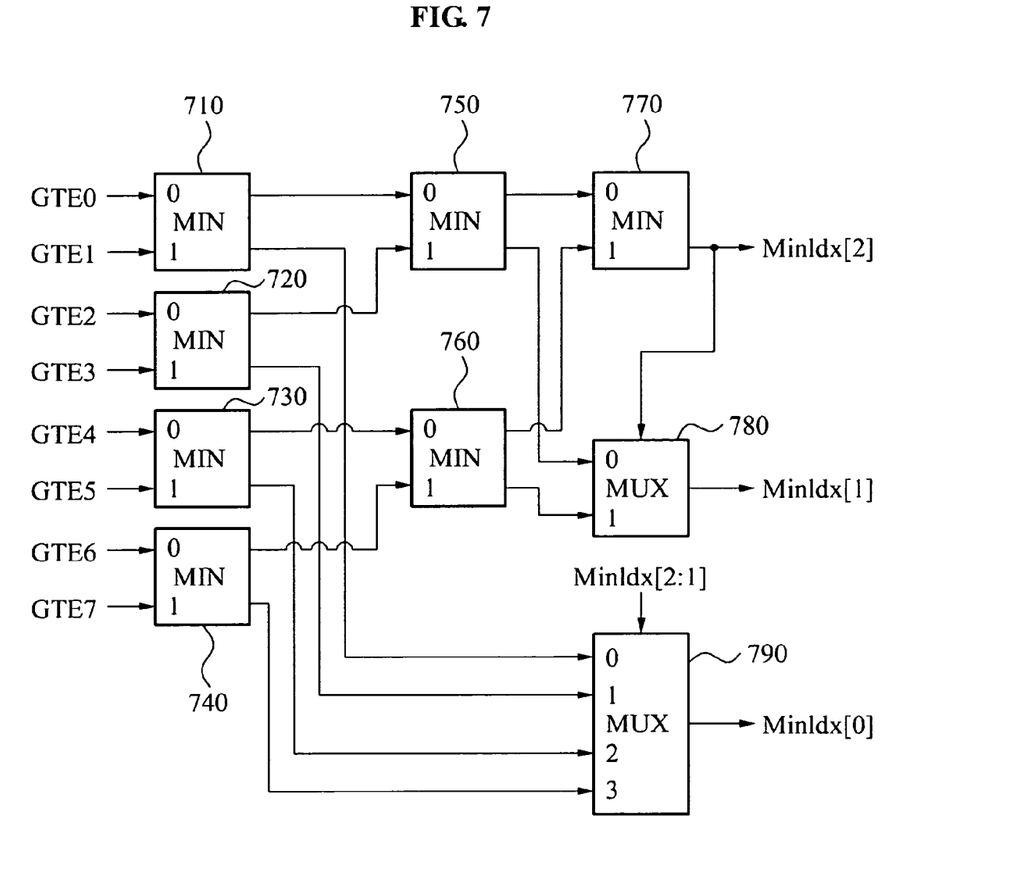
FIG. 7 is a diagram of another hardware structure of an index calculating unit according to example embodiments.

FIG. 7 illustrates a diagram of another hardware structure of an index calculating unit according to example embodiments. Referring to FIG. 7, the index calculating unit may include a plurality of minimum value determination units 710, 720, 730, 740, 750, 760, and 770, and a plurality of MUXs 780 and 790. In FIG. 7, sum values GTE0, GTE1, GTE2, GTE3, GTE4, GTE5, GTE6, and GTE7 obtained by summing component values for each column in a difference array may be input to the minimum value determination units 710, 720, 730, 740, 750, 760, and 770. In other words, FIG. 7 illustrates an example in which eight pieces of data are input.

Each of the minimum value determination units 710, 720, 730, 740, 750, 760, and 770 has two input values. Accordingly, GTE0 and GTE1 may be input to the minimum value determination unit 710, and GTE2 and GTE3 may be input to the minimum value determination unit 720. Additionally, GTE4 and GTE5 may be input to the minimum value determination unit 730 and GTE6 and GTE7 may be input to the minimum value determination unit 740.

The minimum value determination unit 710 may output, as "Min(A1,B1)", a smaller value between GTE0 and GTE1. When GTE0 is greater than GTE1, the minimum value determination unit 710 may output "1" as "Min(1)Idx", and when GTE0 is less than GTE1, the minimum value determination unit 710 may output "0" as "Min(1)Idx".

Additionally, the minimum value determination unit 720 may output, as "Min(A2,B2)", a smaller value between GTE2 and GTE3. When GTE2 is greater than GTE3, the minimum value determination unit 720 may output "1" as "Min(2)Idx", and when GTE2 is less than GTE3, the minimum value determination unit 720 may output "0" as "Min(2)Idx".

Furthermore, the minimum value determination unit 730 may output, as "Min(A3,B3)", a smaller value between GTE4 and GTE5. When GTE4 is greater than GTE5, the minimum value determination unit 730 may output "1" as "Min(3)Idx", and when GTE4 is less than GTE5, the minimum value determination unit 730 may output "0" as "Min(3)Idx".

Moreover, the minimum value determination unit 740 may output, as "Min(A4,B4)", a smaller value between GTE6 and GTE7. When GTE6 is greater than GTE7, the minimum value determination unit 740 may output "1" as "Min(4)Idx", and when GTE6 is less than GTE7, the minimum value determination unit 740 may output "0" as "Min(4)Idx".

In addition, the minimum value determination unit 750 may compare "Min(A1,B1)" with "Min(A2,B2)", and may output, as "Min(A5,B5)", a smaller value between "Min(A1, B1)" and "Min(A2,B2)". When "Min(A1,B1)" is greater than "Min(A2,B2)", the minimum value determination unit 750 may output "1" as "Min(5)Idx", and when "Min(A1,B1)" is less than "Min(A2,B2)", the minimum value determination unit 750 may output "0" as "Min(5)Idx".

Furthermore, the minimum value determination unit 760 may compare "Min(A3,B3)" with "Min(A4,B4)", and may output, as "Min(A6,B6)", a smaller value between "Min(A3, B3)" and "Min(A4,B4)". When "Min(A3,B3)" is greater than "Min(A4,B4)", the minimum value determination unit 760 may output "1" as "Min(6)Idx", and when "Min(A3,B3)" is less than "Min(A4,B4)", the minimum value determination unit 760 may output "0" as "Min(6)Idx".

Moreover, the minimum value determination unit 770 may compare "Min(A5,B5)" with "Min(A6,B6)". When "Min (A5,B5)" is greater than "Min(A6,B6)", the minimum value determination unit 770 may output "1" as "MinIdx[2]", and when "Min(A5,B5)" is less than "Min(A6,B6)", the minimum value determination unit 770 may output "0" as "MinIdx[2]".

The MUX 780 may use "Min(5)Idx" and "Min(6)Idx" as input values. When "MinIdx[2]" has a value of "0", the MUX 780 may output "Min(5)Idx" as "MinIdx[1]. When "MinIdx [2]" has a value of "1", the MUX 780 may output "Min(6) Idx" as "MinIdx[1].

The MUX 790 may use "Min(1)Idx", "Min(2)Idx", "Min (3)Idx", and "Min(4)Idx" as input values. When "MinIdx[2: 1]" has a value of "00", the MUX 790 may output "Min(1) Idx" as "MinIdx[0]". When "MinIdx[2:1]" has a value of "01", the MUX 790 may output "Min(2)Idx" as "MinIdx[0]". Additionally, when "MinIdx[2:1]" has a value of "10", the MUX 790 may output "Min(3)Idx" as "MinIdx[0]". When "MinIdx[2:1]" has a value of "11", the MUX 790 may output "Min(4)Idx" as "MinIdx[0]". Here, the eight pieces of data are input and accordingly, three bits may be used to represent the index.

Figure 8:
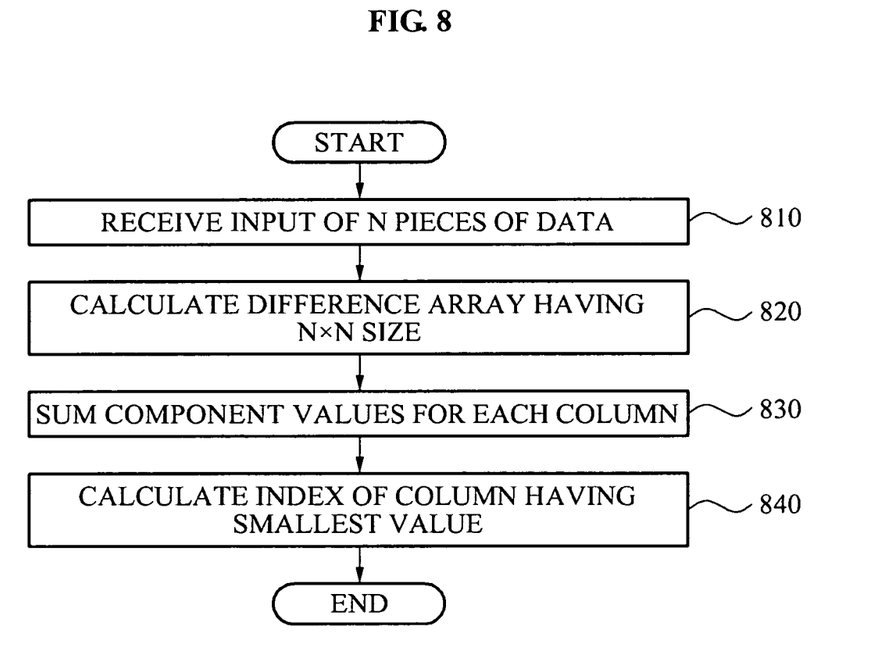
FIG. 8 is a flowchart of a median filtering method according to example embodiments.

FIG. 8 illustrates a flowchart of a median filtering method according to example embodiments. In operation 810, a median filtering apparatus according to example embodiments may receive an input of N pieces of data.

In operation 820, the median filtering apparatus may form a data set including the N pieces of received data, and may calculate a difference array having an N×N size based on the N pieces of data in the data set. The difference array may be an N×N matrix that may have "1" when one of data in the data set has a value greater than another data, and that may have "0" when one of the data in the data set has a value less than another data. The median filtering apparatus may select first data and second data from among the N pieces of data, and may determine whether the first data has a value greater than or equal to a value of the second data.

In operation 830, the median filtering apparatus may sum component values for each column of the difference array. The median filtering apparatus may count non-zero values for each column of the difference array. Additionally, the median filtering apparatus may determine whether a counted value is greater than or equal to a preset value. When the counted value is greater than or equal to the preset value, the median filtering apparatus may output "1". When the counted value is less than the preset value, the median filtering apparatus may output "0". Here, the preset value may correspond to "(N−1)/ 2". Furthermore, the median filtering apparatus may receive an input of the counted value and a predetermined value. Here, the predetermined value may be greater than N indicating a number of pieces of data. When the counted value is greater than or equal to the preset value, the median filtering apparatus may output the counted value. When the counted value is less than the preset value, the median filtering apparatus may output the predetermined value.

In operation 840, the median filtering apparatus may calculate an index of a column having a smallest value among sum values obtained in operation 830. Here, the sum values may be greater than or equal to a preset value. When the sum values obtained in operation 830 are less than the preset value, the median filtering apparatus may determine the predetermined value greater than N as an input value. Otherwise, the median filtering apparatus may determine the sum values obtained in operation 830 as input values. Since two input values are required to determine a minimum value, the median filtering apparatus may use a first input value and a second input value as the two input values. The median filtering apparatus may output a minimum value, and a portion of bits of an index having a closest value to the preset value, based on the first input value and the second input value. Here, the minimum value may refer to a smallest value among input values. The median filtering apparatus may receive an input of the portion of the bits of the index having the closest value to the preset value, and may output a portion of a final bit of the index.

Additionally, the median filtering apparatus may determine whether the first input value is greater than the second input value. When the first input value is greater than the second input value, the median filtering apparatus may output a signal "1". When the first input value is less than or equal to the second input value, the median filtering apparatus may output a signal "0". The median filtering apparatus may output a smaller input value between the first input value and the second input value, using, as a selection signal, a result obtained by the determining.

The median filtering apparatus may store, in a pipeline register, values of indexes calculated during comparing of the sum values.

The median filtering apparatus may store, in a memory, the N pieces of data, and N indexes corresponding to the N pieces of data. Additionally, the median filtering apparatus may determine a median value from the stored N pieces of data, based on a calculated minimum index.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A median filtering apparatus, comprising:
a difference array calculating unit to form a data set comprising N pieces of data (x[i], 0≤i≤N−1), and to calculate a difference array diff[i][j] between one data x[i]

($0 \leq i \leq N-1$) among the N pieces of data and one data x[j] among the N pieces of data;

a summing unit to sum component values (gte[j]=$\Sigma_i$diff[i][j], $0 \leq j \leq N-1$) for columns of the difference array to obtain sum values for the columns of the difference array;

an index calculating unit to calculate an index of a column which has a smallest sum value among the sum values which are greater than or equal to a preset value; and a median value determination unit to determine a median value from the N pieces of data, based on the calculated index, wherein the calculated index is a value representing a column number among the N columns of the difference array.

2. The median filtering apparatus of claim 1, wherein the preset value corresponds to "(N−1)/2".

3. The median filtering apparatus of claim 1, further comprising:
an input unit to receive an input of the N pieces of data; and
a memory unit to store the N pieces of data and N indexes corresponding to the N pieces of data.

4. The median filtering apparatus of claim 1, wherein the difference array calculating unit comprises:
a comparing unit to select first data and second data from among the N pieces of data, and to calculate the difference array by determining whether the first data has a value greater than or equal to a value of the second data.

5. The median filtering apparatus of claim 1, wherein the summing unit comprises:
a counter to count non-zero values for each column of the difference array;
a comparing unit to determine whether a counted value is greater than or equal to the preset value; and
a multiplexer (MUX) to receive an input of the counted value and a predetermined value greater than N, to output the counted value when the counted value is greater than or equal to the preset value, and to output the predetermined value when the counted value is less than the preset value.

6. The median filtering apparatus of claim 5, wherein the counter comprises an adder to perform bitwise counting using N-1 comparison data values as an input, when N pieces of data are contained in the data set.

7. The median filtering apparatus of claim 1, wherein the index calculating unit comprises:
a minimum value determination unit to determine a predetermined value greater than N as an input value when a first sum value is less than the preset value, to determine the first sum value as the input value when the first sum value is greater than or equal to the preset value, and to output a minimum value and bits representing the index based on the input value; and
a multiplexer (MUX) to receive an input of the bits representing the index, and to output data corresponding to the index.

8. The median filtering apparatus of claim 7, wherein the minimum value determination unit comprises:
a comparing unit to determine whether a first input value is greater than a second input value, to output a signal '1' when the first input value is greater than the second input value, and to output a signal '0' when the first input value is equal to or less than the second input value; and
another multiplexer (MUX) to output a smaller input value between the first input value and the second input value, using, as a selection signal, a signal output from the another multiplexer.

9. The median filtering apparatus of claim 1, wherein the index calculating unit comprises a pipeline register to store values of indexes calculated during comparing of the sum values.

10. A median filtering method, comprising:
forming a data set comprising N pieces of data (x[i], $0 \leq i \leq N-1$);
calculating a difference array diff[i][j] between one data x[i] ($0 \leq i \leq N-1$) among the N pieces of data and one data x[i] among the N pieces of data;
summing component values (gte[j]=$\Sigma_i$diff[i][j], $0 \leq j \leq N-1$) for columns of the difference array to obtain sum values for the columns of the difference array;
calculating an index of a column which has a smallest sum value among the sum values which are greater than or equal to a preset value; and
determining a median value from the N pieces of data, based on the calculated index,
wherein the calculated index is a value representing a column number among the N columns of the difference array, and
the method is performed using a median filter.

11. The median filtering method of claim 10, further comprising:
storing the N pieces of data and N indexes corresponding to the N pieces of data.

12. The median filtering method of claim 10, wherein the forming comprises selecting first data and second data from among the N pieces of data, and the calculating the difference array comprises determining whether the first data has a value greater than or equal to a value of the second data.

13. The median filtering method of claim 10, wherein the summing comprises:
counting non-zero values for each column of the difference array;
determining whether a counted value is greater than or equal to the preset value;
receiving an input of the counted value and a predetermined value greater than N;
outputting the counted value when the counted value is greater than or equal to the preset value; and
outputting the predetermined value when the counted value is less than the preset value.

14. The median filtering method of claim 10, wherein the calculating of the index comprises:
determining a predetermined value greater than N as an input value when a first sum value is less than the preset value;
determining the first sum value as the input value when the first sum value is greater than or equal to the preset value;
outputting a minimum value and bits representing the index based on the input value; and
receiving an input of bits representing the index, and outputting data corresponding to the index.

15. The median filtering method of claim 14, further comprising:
determining whether a first input value is greater than a second input value, outputting a signal '1' when the first input value is greater than the second input value, and outputting a signal '0' when the first input value is equal to or less than the second input value; and
outputting a smaller input value between the first input value and the second input value, using, as a selection signal, a result obtained by determining whether the first input value is greater than the second input value.

16. The median filtering method of claim 10, wherein the calculating of the index comprises storing values of indexes calculated during comparing of the sum values.

17. The median filtering method of claim 10, wherein:
the forming comprises forming a data set comprising N pieces of data,
the difference array corresponds to an N×N matrix, having a first component which corresponds to a value at an intersection of a first row and a first column of the N×N matrix, and
the first component of the difference array is calculated by comparing a first value from the data set which corresponds to the first row, with a second value from the data set which corresponds to the first column.

18. The median filtering method of claim 17, wherein the component is calculated to have a value of "0" when the first value from the data set is less than the second value from the data set, and is calculated to have a value of "1" when the first value from the data set is greater than the second value from the data set.

* * * * *

UNITED STATES PATENT AND TRADEMARK OFFICE
CERTIFICATE OF CORRECTION

PATENT NO.       : 8,903,190 B2  
APPLICATION NO.  : 13/067949  
DATED            : December 2, 2014  
INVENTOR(S)      : Sung Bae Park et al.

Page 1 of 1

It is certified that error appears in the above-identified patent and that said Letters Patent is hereby corrected as shown below:

In the Claims

Column 14, line 10, In Claim 10, delete "x[i]" and insert -- x[j] --, therefor.

Signed and Sealed this  
Second Day of June, 2015

Michelle K. Lee  
*Director of the United States Patent and Trademark Office*